United States Patent [19]

Albers

[11] Patent Number: 4,979,091
[45] Date of Patent: Dec. 18, 1990

[54] CONTROL OF A BLENDING SYSTEM

[75] Inventor: Lloyd R. Albers, Angleton, Tex.

[73] Assignee: Phillips Petroleum Company, Bartlesville, Okla.

[21] Appl. No.: 923,254

[22] Filed: Oct. 27, 1986

[51] Int. Cl.$^5$ ............................................. G06F 15/46
[52] U.S. Cl. ..................................... 364/148; 364/502
[58] Field of Search ............... 364/500, 502, 510, 148, 364/152, 153; 422/62, 110; 23/306; 137/3, 88; 260/698, 699

[56] References Cited

U.S. PATENT DOCUMENTS

| | | | |
|---|---|---|---|
| 3,229,077 | 1/1966 | Gross | 364/502 |
| 3,475,392 | 10/1969 | McCoy et al. | 260/83.7 |
| 3,605,775 | 9/1971 | Zaander et al. | 364/502 |
| 4,332,590 | 6/1982 | Smith | 23/230 A |
| 4,611,294 | 9/1986 | Stanfill | 364/510 |

Primary Examiner—Jerry Smith
Assistant Examiner—John R. Lastova
Attorney, Agent, or Firm—George E. Bogatie

[57] ABSTRACT

In a system for blending of streams having various flow rates, various concentrations of a selected material, and various transport times from a point where measurements are taken to a mixing tank containing the blended product, signals representative of flow rates and concentrations are continually established for a plurality of streams. These signals are processed in a supervisory computer which provides a calculated control signal to manipulate the concentration of one of the stream being blended in such a manner that a predetermined desired concentration of a selected material is achieved for the blended product.

3 Claims, 3 Drawing Sheets

CONTROL OF A BLENDING SYSTEM

This invention relates to the blending of streams having various flow rates and various concentrations of a selected material. In one aspect it relates to continuously manipulating the composition of one of the streams being blended in such a manner that a blended product is provided which has a specified composition.

The present invention was applied to a blending system for controlling the purity of the propane product from a refinery, and will be described in terms of such a system. However the invention is applicable to the continuous control of gas or liquid blending where it is desired to meet a product specification by blending streams of various flow rates and composition.

Many process units in a refinery yield propane which is a valuable product which can be sold. For example, a fluid cat cracker unit, an ethylene unit, and a natural gas fractionator such as a deethanizer all can yield streams which contain primarily propane along with an ethane impurity. However the liquid propane for a sellable product must meet a specification such as 95% propane by volume. As used herein a stream from a process unit containing propane and an ethane impurity is referred to as a "unit blending stream."

When a petroleum process unit produces propane for a sellable product, its unit blending stream is transported to a mixing tank. Typically the mixing tank will receive a plurality of unit blending streams, and control of the propane product purity in the blending tank is complicated by the typically long runs of pipe between the blending tank and the process units which produce the unit blending streams. The long pipe runs, which can vary for each unit blending stream, can result in time lags of an hour or more between detecting an off specification propane product in the mixing tank and initiation of corrective control action in a process unit producing the unit blending streams.

In the past it has been typical to operate process units that produce the unit blending streams at an artificially high purity of propane to insure that the blended propane product was maintained within product specification. However, for economic reasons, it would be desirable to maximize the ethane content of the propane product while still meeting the product purity specification for the propane.

It is thus an object of this invention to continuously control a blending system so that the blended product meets a purity specification without exceeding the purity specification.

In accordance with the present invention there is provided method and apparatus for manipulating the ethane concentration in the unit blending stream from one process unit so that the manipulated process unit provides a unit blending stream having a desired ethane concentration. The unit blending stream from the manipulated process unit is combined with other unit blending streams that are uncontrolled in ethane concentration to obtain a blended propane product having a desired predetermined propane concentration.

An analysis measurement and a flow measurement of each unit blending stream is obtained at each process unit. Based on the actual ethane analysis and the actual flow rate of the various unit blending streams, the volume of ethane in the blended product is calculated. Then the maximum quantity of ethane that could be admitted with the unit blending stream from the manipulated process without exceeding the propane purity specification for the blended product, is back calculated. The set point of an analyzer controller on the manipulated process is then adjusted to provide the maximum amount of ethane allowed by the product specification for the blended product. In this manner the propane product purity is maintained at the specified value without exceeding the specified purity.

Other objects and advantages of the invention will be apparent from the foregoing brief description of the invention and the claims as well as the detailed description of the drawing which are briefly described as follows.

As previously stated, the control system of the invention is described in terms of blending propane containing streams in a refinery. However the invention is applicable to the continuous control of gas or liquid blending where it is desired to meet a product specification by blending streams of various flow rates and composition. The present invention can be applied to simple systems where only two streams are blended or can be applied to complex systems where hundreds of streams are blended.

Figure 1:
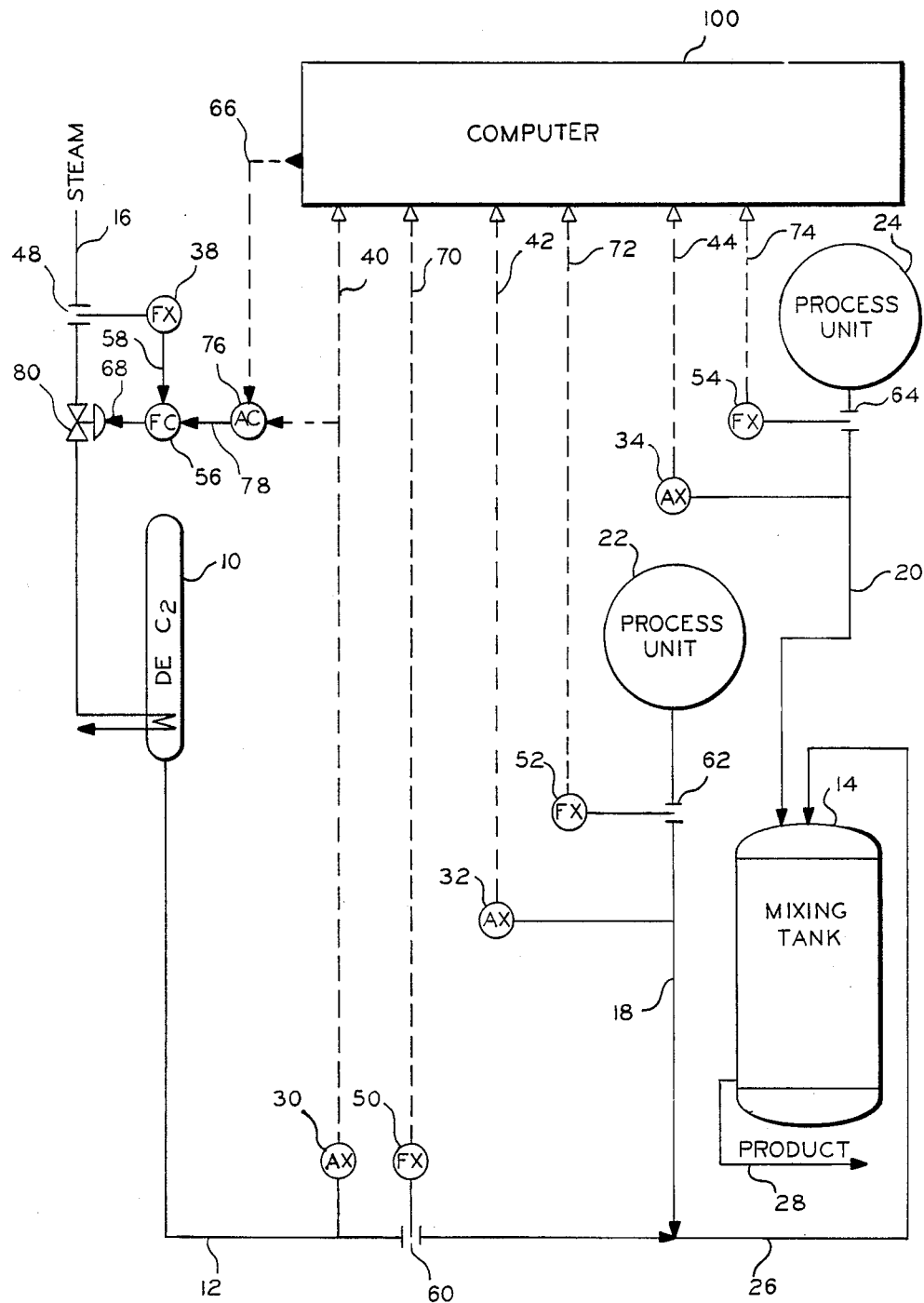
FIG. 1 is a diagrammatic illustration of a system for blending distillate materials from a plurality of process units and the associated control system of the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital from or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Other types of computing devices could also be used in the invention. The digital computer used was an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative oi a comparison of the two input signals, is within the scope of the invention.

The scaling of an output signal by a controller is well known in control system art. Essentially, the output of a controller may be scaled to represent any desired factor or variable. An example oi this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations oi one or more such equipment types. While the presently preferred embodiment of the invention preferably utilizes a combination oi pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square oi the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative oi a desired process value will bear a relationship to the measured parameter or desired value which Permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1 there illustrated a deethanizer 10 from which a bottoms stream is removed through conduit means 12. The material flowing in conduit means 12 is primarily propane but also contains ethane as an impurity. As previously stated this stream is referred to as a "unit blending stream", and is provided to mixing tank 14. Additional unit blending streams are shown flowing in conduit means !8 and 20 which remove the unit blending stream from process units 22 and 24 respectively. Mixing tank 14 receives the unit blending streams via conduits 20 and 26, where the material is thoroughly mixed before being transported to product storage via conduit means 28.

The blending of the streams flowing in conduit means 12, 18 and 20 described to this point is conventional. It is the manner in which a control signal is applied to the deethanizer 10 which provides the novel feature of this invention.

Analyzer transducers 30, 32 and 34, which are preferably a model 102 process chromatograph analyzers manufactured by Applied Automation, Inc., Bartlesville, OK, are in fluid communication with the unit blending streams flowing in conduit means 12, 18 and 20 respectively. Analyzer transducers 30, 32 and 34 provide output signals 40, 42 and 44 which are respectively representative of the concentration of ethane impurity in the propane flowing in conduit means 12, 18 and 20. Signals 40, 42 and 44, as provided from their respective analyzer transducers as inputs to computer 100.

Flow transducers 50, 52, and 54 in combination with flow sensors 60, 62 and 64 respectively which are operatively located in conduit means 12, 18 and 20 respectively provide output signals 70, 72, and 74 which are respectively representative of the flow rates of the unit blending streams flowing conduit means 12, 18 and 20. Flow signals 70, 72 and 74 are provided an inputs to computer 100.

In response to the above described input signal computer 100 calculates a set point signal 66 for the concentration of ethane in the propane of the unit blending stream flowing in conduit means 12. Signal 66 which is representative of a calculated set point for the ethane concentration is provided to analyzer controller 76. Signal 66 is updated on each execution of the continuous blending control program which is periodically executed in computer 100, as will be explained more fully hereinafter. Analyzers signal 40 is also provided to controller 76 as a process variable input. In response to signals 66 and 40, flow controller 76 provides an output signal 78 which is responsive to the difference between signals 66 and 40. Signal 78 is scaled so as to be representative of the flow rate of steam in conduit means 16 required to maintain the actual concentration of ethane represented by analysis signal 40, substantially equal to the desired concentration represented by set point signal 66. Signal 78 is provided as a set point signal to flow controller 56.

Flow transducer 38 in combination with flow sensor 48 which is operably located in conduit means 16 provides an output signal 58 which is representative oi the actual flow rate of steam in conduit means 16. Signal 58 is provided from flow transducer 38 as the process variable input to flow controller 56. In response to signals 78 and 58 flow controller 56 provides an output signal 68 which is responsive to the difference between signals 78 and 58. Signal 6g is scaled so as to be representative of the position of control valve 80, which is operably located in conduit means 16, required to maintain the actual flow rate of steam substantially equal to the desired flow rate represented by signal 78. Signal 68 is provided as a control signal to control value 80.

Figure 2:
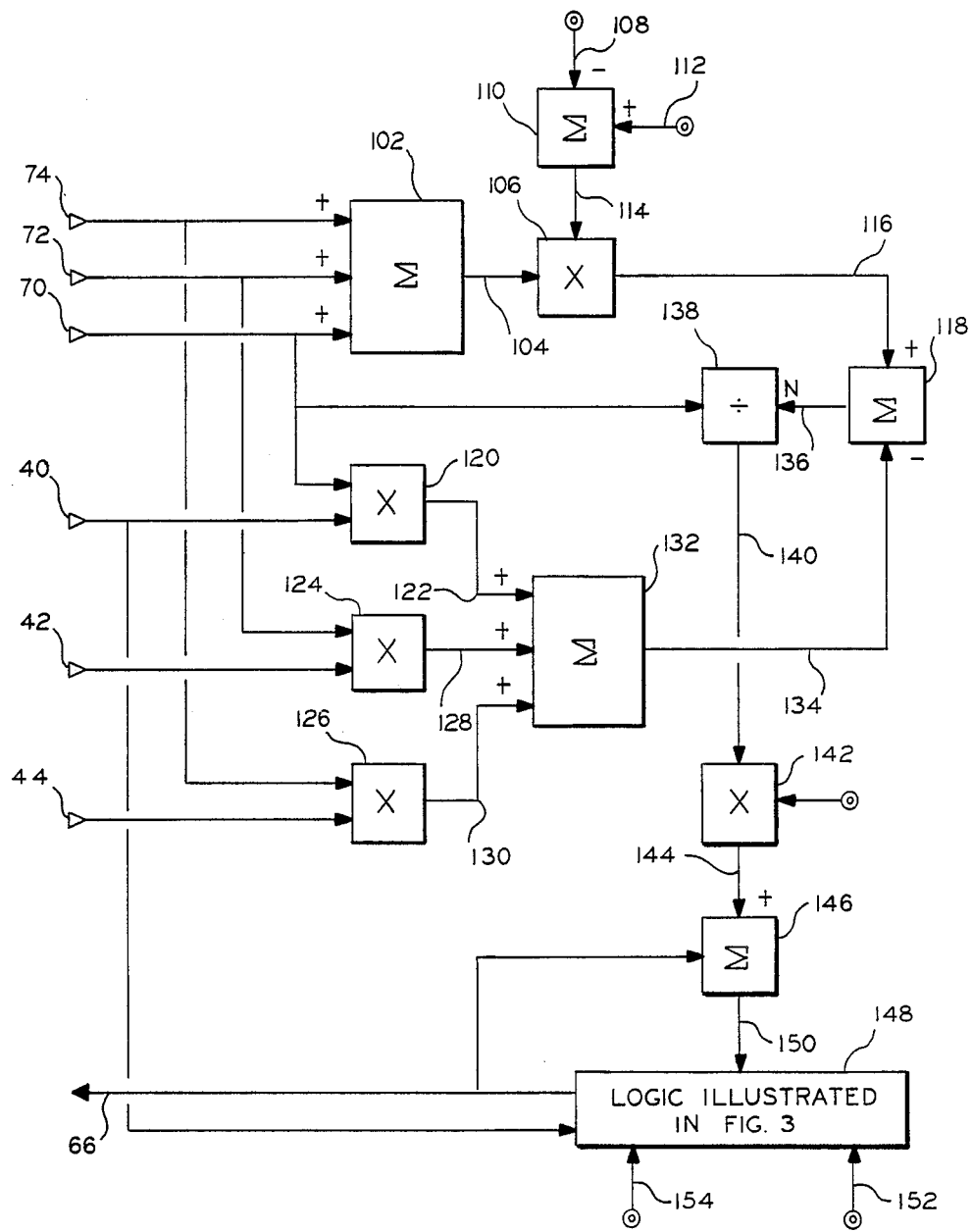
FIG. 2 is a representation of computer logic suitable for the calculation of the concentration in accordance with the invention.

The computer block diagram utilized to calculate control signal 66 in response to the previously described inputs is illustrated in FIG. 2. Referring now to FIG. 2, flow signals 70, 72 and 74 are provided to summation block 102. Block 102 provides an output signal 104 which is representative oi the total flow of the unit blending streams flowing in conduit means 12, 18 and 20. Signal 104 is provided from summation block 102 as a first input to multiplying block 106.

Signal 108 which is an operator entered input representative of the percent purity specification for the propane product flowing in conduit means 28 is provided as a first input to summation block 110. Signal 112 which is representative of 100% is provided as a second input to summation block 110. Summation block 110 provides an output signal which is representative of the difference between signals 112 and 108 and therefore is representative of the percent of the fluid flowing in conduit means 28 that is not propane. Stated another way signal 114 is representative of the maximum ethane concentration of the fluid flowing in conduit means 28 that will meet the product specification. Signal 114 is provided as a second input to multiplying block 106.

Multiplying block 106 provides an output signal 116 which is representative of the desired flow rate of ethane flowing per hour into mixing tank 14. Signal 116 is provided as a first input to summation block 118.

Analysis signal 40 which is representative of the ethane concentration in the propane unit blending stream flowing in conduit means 12 is provided as a first input to multiplying block 120. Flow signal 70 is provided as a second input to multiplying block 120. Multiplying block 120 provides an output signal 122 which is representative of the actual flow rate per hour of ethane flowing in conduit means 12. In a similar manner multiplying blocks 124 and 126 provide output signals 128 and 130 respectively which are representative of the flow rate of ethane flowing in unit blending streams 18 and 20 respectively. Signals 122, 128 and 130 are provided as inputs to summation block 132 which provides an output signal 134 which is representative of the total flow rate of ethane per hour flowing to the mixing tank 14 through conduit means 12, 18 and 20. Signal 134 is provided as a second input to summation block 118.

Summation block 118 provides an output signal 136 which is representative of the difference between the desired and actual flow rates of ethane flowing per hour into mixing tank 14. A positive value for signal 136 indicates the flow rate of ethane per hour that could be added to the current flow rate of ethane being admitted to storage tank 14 without exceeding the product purity specification for propane. A negative value for signal 136 indicates that the propane purity specification will be violated.

Signal 136 is provided as the numerator input to dividing block 138. Signal 70 which is representative oi the actual flow rate of the unit blending stream flowing in conduit means 12 is provided as the denominator input to dividing block 138. Block 138 provides an output signal 140 which is rePresentative of the fractional flow oi ethane which could be added to the ethane flowing in conduit means 12 while still meeting the propane purity specification. Signal 140 is multiplied by 100 in multiplying block 142 which provides an output signal 144 representative of the percent flow of ethane which could be added to the ethane flowing in conduit means 12.

Signal 144 is provided as a first input to summation block 146. Signal 66 which is representative of the desired concentration of ethane in the unit blending stream flowing in conduit means 12 is provided from logic block 148 to summation block 146. Summation block 146 provides an output signal 150 which is representative of the maximum concentration of ethane in the unit blending stream flowing in conduit means 12.

However, it is noted that it is not desirable to immediately increase the set point signal 66 to the maximum allowable flow rate of ethane, since such a sudden change could upset other units that interact with deethanizer 10. As was mentioned previously set point signal 66 is updated on each execution of the control program in computer 100 as is illustrated by the logic in block 148.

Signal 154 is an operator entered signal, which is representative of an increment by which signal 66 may be changed on each execution of the control program. For example if the control program is executed every 15 seconds, and it is desired to change signal 66 at a rate of 1.5% every hour, each execution of the control program would change signal 66 by about 0.62% and this value would be represented by signal 154.

Signal 152 which is also an operator entered signal is representative of various limits that may be applied to control signal 66.

Figure 3:
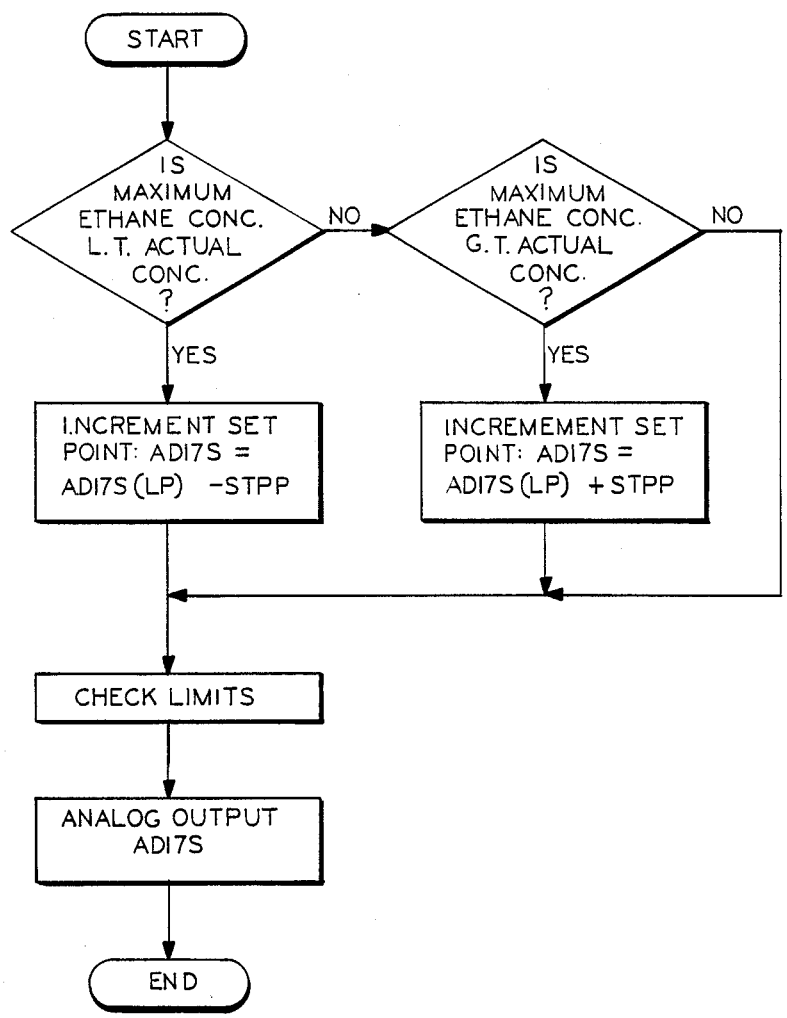
FIG. 3 is a computer logic flow diagram utilized to generate the set point for the analyzer controller in accordance with the invention.

The various signals which are input to logic block 148 as illustrated in FIG. 2 are utilized in the logic diagram illustrated in FIG. 3 to determine the updated value of set point signal 66. Signal definitions utilized in FIG. 3 are defined as follows:

Max. ethane concentration=signal 150,
Actual ethane concentration=signal 40,
AD17S=updated value for signal 66,
AD17S(LP)=current value for signal 66, retained from last update,
STPP=signal 154
LIMITS=signal 152

Referring now to FIG. 3, first a determination is made as to whether or not the concentration of the ethane impurity in the propane in the unit blending streams flowing in conduit means 12 is less than the actual concentration represented by signal 40.

If the maximum concentration is less than the actual concentration in conduit means 12, set point signal 66 is decreased by the amount specified by signal 154 in the statement $AD17S = AD17S_{(LP)} - STPP$.

If the maximum concentration is not less, than actual concentration in conduit means 12, a determination is made as to whether or not the maximum concentration is greater than the actual concentration. I: the maximum concentration is greater than the actual concentration, set point signal 66 is increased by the amount specified by signal 150 in the statement $AD17S = AD17S_{(LP)} + STPP$.

From FIG. 3, it can be seen that set point signal 66 is not incremented if the maximum and actual values of ethane concentration are equal.

The invention has been disclosed in terms of a preferred embodiment as illustrated in FIGS. 1-3. Specific components which can be utilized in the practice of the invention such s flow sensors 48,60,62, and 74, flow transducers 38, 50, 52 and 54, and controllers 56 and 76 are each well known commercially available components such as are described at length in Perry's Chemical Engineers Handbook, 5th edition, Chapter 22, McGraw-Hill.

For reasons of brevity conventions auxiliary equipment normally associated with a blending system, such as, mixers, pumps, additional measurement and control devices, etc. have not been illustrated since they play no part in the explanation of the invention.

While the invention has been described in terms of the presently preferred embodiment reasonable variations and modifications are possible by those skilled in the art and such modifications and variations are within the scope of the described invention and the appended claims.

What is claimed is:

1. A method of continuously blending a plurality of fluid streams to obtain a blended product having a predetermined desired concentration of a selected material, wherein each of said plurality of fluid streams is a unit blending stream comprising a major portion of a selected material and a minor portion of an impurity material, and wherein a first unit blending stream is provided from a first process operating unit to a mixing tank located at a distance from said first process operating unit, and wherein said first process operating unit can be controlled to vary the concentration of said impurity material and the concentration of said selected material in said first unit blending stream and further wherein a second process unit, located at a distance from said mixing tank provides a second unit blending stream to said mixing tank, said method comprising the steps of:

establishing a first signal representative of the concentration of said impurity material in said first unit blending stream wherein said first signal is obtained at said first process unit:

establishing a second signal representative of the concentration of said impurity material in said second unit blending stream wherein said second signal is obtained at said second process unit;

establishing a third signal representative of the desired concentration of said selected material in said blended product;

establishing a fourth signal representative of the actual flow rate of said first unit blending stream;

establishing a fifth signal representative of the actual flow rate of said second unit blending stream, establishing a sixth signal representative of the desired concentration of said impurity material in said first unit stream in response to said first through fifth signals, wherein said step of establishing said sixth signal comprises:

summing said fourth and said fifth signal to establish a seventh signal which is representative of the actual total flow rate to said mixing tank;

multiplying said fourth signal by said first signal to establish an eighth signal which is representative of the volume flow rate of said impurity material flowing in said first unit blending stream;

multiplying said fifth signal by said second signal to establish a ninth signal which is representative of the volume flow rate of said impurity material flowing in said second unit blending stream;

summing said eighth signal and said ninth signal to establish a tenth signal which is representative of the actual total volume flow rate of said impurity material flowing to said mixing tank;

establishing an eleventh signal responsive to said third signal which is representative of the maximum concentration of said impurity material in said blended product which will satisfy the purity specification for said selected material in said blended product;

multiplying said eleventh signal by said seventh signal to establish a twelve signal representative of the maximum actual volume flow rate of said impurity material flowing into said mixing tank, wherein the maximum impurity material in the mixing tank corresponds to the minimum selected material that will satisfy said predetermined desired concentration of selected material;

subtracting said tenth signal from said twelfth signal to establish a thirteenth signal which is representative of the volume flow rate of said impurity material that can be summed with the actual flow rate of said impurity flowing to said mixing tank to maintain the actual concentration of said selected material substantially equal to said desired concentration of said selected material represented by said third signal;

dividing said thirteenth signal by said fourth signal to establish a fourteenth signal which is representative of the maximum fractional flow that said fourth signal can be changed while maintaining the actual concentration of said selected material substantially equal to said desired concentration of said selected material represented by said third signal, and establishing said sixth signal in response to said fourteenth signal.

2. Method in accordance with claim 1 wherein the step of establishing said sixth signal in response to said fourteenth signal comprises:

multiplying said fourteenth signal by 100 to establish a fifteenth signal representative of the maximum percentage change for said sixth signal which will still maintain the actual concentration of said selected material substantially equal to the desired concentration represented by said third signal;

summing said fifteenth signal with said sixth signal calculated during a first execution of a control program to establish a sixteenth signal representative of the maximum concentration of said impurity material flowing in said first unit blending stream that will maintain the actual concentration of said selected material substantially equal to said desired concentration of said selected material represented by said third signal;

establishing a seventeenth signal representative of an increment by which said sixth signal can change on each execution of said control program.

comparing said sixteenth signal to said first signal to determine if said sixteenth signal is less than said first signal, equal to said first signal, or less than said first signal;

subtracting said seventeenth signal from said sixteenth signal to establish said sixth signal for a second execution of said control program if said sixteenth signal is less than said first signal;

adding said seventeenth sIgnal to saId sixteenth signal to establish said sixth signal for said second execution of said control program if said sixteenth signal is greater than said first signal; and establishing said sixth signal equal to said sixteenth signal for said second execution of a control program if said sixteenth signal is equal to said first signal.

3. Apparatus for continuously blending a plurality of fluid streams to obtain a blended product having a predetermined desired concentration of a selected material, wherein each of said plurality of fluid streams is a unit blending stream comprising a major portion of said selected material and a minor portion of an impurity material, said apparatus comprising:

a mixing tank;

a deethanizer unit for providing a first unit blending stream, wherein said first unit blending stream transports fluid over a distance from said deethanizer unit to said mixing tank;

a second process operating unit for providing a second unit blending stream, wherein said second unit blending stream transports fluid over a distance from said second operating unit to said mixing tank;

means for withdrawing said blended product from said mixing tank;

means for establishing a first signal representative of the concentration of said impurity material in said first unit blending stream wherein said first signal is obtained at said first process unit;

means for establishing a second signal representative of the concentration of said impurity material in said second unit blending stream wherein said second signal is obtained at said second process unit;

means for establishing a third signal representative of the desired concentration of said selected material in said blended product;

means for establishing a fourth signal representative of the actual flow rate of said first unit blending stream;

means for establishing a fifth signal representative of the actual flow rate of said second unit blending stream;

means for establishing a sixth signal representative of the desired concentration of said impurity material in said first unit blending stream in response to said first through fifth signals, wherein said sixth signal is based on meeting the desired concentration of said selected material in said blended product as represented by said third signal;

means for controlling said deethanizer which comprises:

means for comparing said first signal and said sixth signal and for establishing a seventh signal which is responsive to the difference between said first signal and said sixth signal, wherein said seventh signal is scaled so as to be representative of the flow rate of heating fluid to said deethanizer required to maintain the concentration of said impurity material entering said first unit blending stream substantially equal to the desired concentration represented by said sixth signal; and means for manipulating the flow rate of heating fluid to said deethanizer in response to said seventh signal.

* * * * *